(12) United States Patent
Murafuji et al.

(10) Patent No.: US 11,511,650 B2
(45) Date of Patent: Nov. 29, 2022

(54) VEHICLE SEAT

(71) Applicant: NHK SPRING CO., LTD., Yokohama (JP)

(72) Inventors: Hisashi Murafuji, Yokohama (JP); Yuji Noto, Yokohama (JP); Ryota Matsui, Yokohama (JP); Kosuke Tayama, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 0 days.

(21) Appl. No.: 17/454,597

(22) Filed: Nov. 11, 2021

(65) Prior Publication Data

US 2022/0161698 A1    May 26, 2022

(30) Foreign Application Priority Data

Nov. 24, 2020    (JP) .............................. JP2020-194340

(51) Int. Cl.
*B60N 2/30* (2006.01)
*B60N 2/14* (2006.01)
(Continued)

(52) U.S. Cl.
CPC ............. *B60N 2/3038* (2013.01); *B60N 2/12* (2013.01); *B60N 2/146* (2013.01); *B60N 2/20* (2013.01);
(Continued)

(58) Field of Classification Search
CPC . B60N 2/12; B60N 2/146; B60N 2/20; B60N 2/3038; B60N 2/3065;
(Continued)

(56) References Cited

U.S. PATENT DOCUMENTS 7,029,063 B2* 4/2006 Holdampf ................ B60N 2/36
297/15
8,851,549 B2* 10/2014 Holzhueter .......... B60N 2/3011
296/65.09
(Continued)

FOREIGN PATENT DOCUMENTS

DE          10308685 C5 *  6/2010  ........... B60N 2/3013
JP       H07-237478 A      9/1995
(Continued)

OTHER PUBLICATIONS

Japanese Office Action issued for Japanese Patent Application No. 2020-194340, dated Nov. 24, 2021 in 4 pages including English translation.

*Primary Examiner* — Syed A Islam
(74) *Attorney, Agent, or Firm* — Knobbe, Martens, Olson & Bear, LLP

(57) ABSTRACT

A vehicle seat includes a back frame connected to a base member so as to be able to rotate around a first rotation shaft; a rotation locking mechanism; a cushion frame connected to the back frame so as to be able to rotate around a second rotation shaft, and in which a long hole is formed; a link member connected to the base member so as to be able to rotate around a third rotation shaft; a fourth rotation shaft fixed to the link member and inserted in the long hole so as to be able to move relatively and so as to be able to rotate; and movement restricting portion provided between the fourth rotation shaft and an inner surface of the long hole, and that restricts movement of the fourth rotation shaft from one end portion of the long hole toward another end portion side.

7 Claims, 14 Drawing Sheets

(51) Int. Cl.
    *B60N 2/20*         (2006.01)
    *B60N 2/12*         (2006.01)

(52) U.S. Cl.
    CPC .......... *B60N 2/3011* (2013.01); *B60N 2/3013* (2013.01); *B60N 2/3031* (2013.01); *B60N 2/3065* (2013.01)

(58) Field of Classification Search
    CPC .. B60N 2/3031; B60N 2/3011; B60N 2/3013; B60N 2/3047; B60N 2/305
    See application file for complete search history.

(56) References Cited

U.S. PATENT DOCUMENTS

| | | | |
|---|---|---|---|
| 8,882,197 B2* | 11/2014 | Line | B60N 2/3031 |
| | | | 297/331 |
| 9,919,626 B2* | 3/2018 | Goodhall | B60N 2/233 |
| 10,829,014 B2* | 11/2020 | Sivaraj | B60N 2/36 |
| 10,843,599 B2* | 11/2020 | Arico | B60N 2/3065 |
| 2009/0001795 A1* | 1/2009 | Homier | B60N 2/22 |
| | | | 297/340 |
| 2012/0056459 A1* | 3/2012 | Harden | B60N 2/3013 |
| | | | 297/316 |
| 2016/0339813 A1* | 11/2016 | Dubois | B60N 2/938 |
| 2019/0366886 A1* | 12/2019 | Sivaraj | B60N 2/3011 |
| 2021/0291702 A1* | 9/2021 | Takeda | B60N 2/06 |

FOREIGN PATENT DOCUMENTS

| | | |
|---|---|---|
| JP | 2000-247170 A | 9/2000 |
| JP | 2001-026230 A | 1/2001 |
| JP | 2005-161981 A | 6/2005 |
| JP | 2009-154681 A | 7/2009 |

* cited by examiner

VEHICLE SEAT

CROSS-REFERENCE TO RELATED APPLICATION

This application is based on and claims priority under 35 USC 119 from Japanese Patent Application No. 2020-194340 filed on Nov. 24, 2020, the disclosure of which is incorporated by reference herein.

BACKGROUND

Technical Field

The present disclosure relates to a vehicle seat.

Related Art

A vehicle seat is disclosed in Japanese Patent Application Laid-Open (JP-A) No. 2000-247170. This vehicle seat has a seat cushion, a seatback, and a reclining mechanism (rotating mechanism) that can permit and restrict relative rotation between the seatback and the seat cushion. Tilting mechanism provided at the vehicle floor rotatably support the seat cushion. The Tilting mechanism includes floor mounted bodies that are fixed to the vehicle floor, and tilting members whose lower end portions are rotatably connected to the floor mounted bodies. The seat cushion has brackets. Sliding shafts that are fixed to the upper end portions of the tilting members are inserted in long holes (slits) that are provided in the brackets and extend in the front-rear direction. The Tilting mechanism includes coil springs that urge the tilting members to rotate toward the front side with respect to the floor mounted bodies.

At the time when the seatback is in a predetermined upright position, the seat cushion is positioned at a seatable position at which a vehicle occupant can sit thereon. At this time, the states in which the sliding shafts are positioned at the front end portions of the long holes of the brackets are maintained by the rotation urging forces of the coil springs. Therefore, movement of the sliding shafts within the long holes toward the front side is restricted. Accordingly, at the time when the reclining mechanism is in a locking state, even if a vehicle occupant sits-down on the seat cushion, the seat cushion is maintained at the seatable position.

When, in this state, locking of the reclining mechanism is released and the seatback is rotated toward the front side from its upright position, interlockingly with the rotation of the seatback, the sliding shafts move in the long holes of the brackets from the front end portions to the rear end portions. Therefore, the tilting members rotate around the lower end portions thereof, and the seat cushion moves toward a front and lower side. Namely, the seat cushion is tilted down.

In the above-described vehicle seat, when the seat cushion is positioned at the seatable position, the states in which the sliding shafts are positioned at the front end portions of the long holes of the brackets are maintained by the coil springs. Namely, the vehicle seat requires the coil springs that are configured such that the position of the seat cushion that is at the seatable position does not change. Therefore, the number of parts of the vehicle seat is large, and the structure thereof is complex.

In view of the above-described circumstances, an object of the present disclosure is to provide a vehicle seat that, although having a small number of parts and a simple structure, are configured such that the position of a seat cushion does not change at the time when rotation locking mechanisms are in locking states and a vehicle occupant sits-down on the seat cushion.

SUMMARY

A vehicle seat relating to a first aspect of the present disclosure includes: a base member supported at a vehicle floor; a back frame that is a frame member of a seatback and is connected to the base member so as to be able to rotate around a first rotation shaft that extends in a vehicle transverse direction; a rotation locking mechanism that switches between an unlocking state of permitting relative rotation of the back frame with respect to the base member, and a locking state of restricting the relative rotation; a cushion frame that is a frame member of a seat cushion, and is connected to the back frame so as to be able to rotate around a second rotation shaft that is parallel to the first rotation shaft, and in which is formed a long hole whose length direction runs along a vehicle longitudinal direction; a link member connected to the base member so as to be able to rotate around a third rotation shaft that is parallel to the first rotation shaft; a fourth rotation shaft that is fixed to the link member, and is inserted in the long hole so as to be able to move relatively in the length direction and so as to be able to rotate around its own axis that is parallel to the first rotation shaft, and, when the seatback and the seat cushion are in states of usage, the fourth rotation shaft is positioned at one end portion in the length direction of the long hole, and, when the seatback and the seat cushion are in stored states, the fourth rotation shaft is positioned further toward another end portion side in the length direction than the one end portion of the long hole; and a movement restricting portion that is provided at an inner surface of the long hole and at the fourth rotation shaft, and that, when the rotation locking mechanism is in the locking state and the seatback is in the state of usage, restricts movement of the fourth rotation shaft from the one end portion toward the other end portion side.

Note that "along the vehicle longitudinal direction" in the present specification and claims includes exactly parallel to the vehicle longitudinal direction, and slightly inclined with respect to the direction exactly parallel to the vehicle longitudinal direction.

In accordance with the vehicle seat of the first aspect of the present disclosure, the seat cushion is connected, so as to be able to rotate around the second rotation shaft, to the back frame that is connected to the base member so as to be able to rotate around the first rotation shaft. Moreover, the link member is connected to the base member so as to be able to rotate around the third rotation shaft. Further, the fourth rotation shaft that is fixed to the link member is inserted in the long hole, which is formed in the cushion frame, so as to be able to move relatively in the length direction of the long hole and so as to be able to rotate around its own axis. Therefore, the seat cushion (the cushion frame) rotates interlockingly with rotation of the seatback (the back frame).

When the rotation locking mechanism is in the locking state and the seatback is in the state of usage, movement of the fourth rotation shaft from one end portion of the long hole toward the other end portion side is restricted by the movement restricting portion. Namely, when the rotation locking mechanism is in the locking state and the seatback is in the state of usage, rotational operation of the seat cushion and the seatback is restricted by the movement restricting portion. Accordingly, in a case in which the rotation locking mechanism is in the locking state, even if a vehicle occupant sits-down on the seat cushion that is in a state of usage, the position of the seat cushion does not change.

Moreover, the movement restricting portion is provided at the fourth rotation shaft and the inner surface of the long hole. Therefore, in the first aspect of the present disclosure, the vehicle seat has a small number of parts, and the structure of the vehicle seat can be made to be simple.

In a vehicle seat relating to a second aspect of the present disclosure, in the vehicle seat of the first aspect, when the seatback and the seat cushion are positioned in predetermined rotation regions, the seatback and the seat cushion are in the states of usage.

In accordance with the vehicle seat of the second aspect of the present disclosure, when the rotation locking mechanisms are in the locking states, no matter which rotational positions in predetermined rotation regions the seatback and the seat cushion are positioned at, the position of the seat cushion does not change when a vehicle occupant sits-down on the seat cushion.

In a vehicle seat relating to a third aspect of the present disclosure, in the vehicle seat of the first aspect, the movement restricting portion includes: a retainer projection that is provided at a region, which is positioned further toward the other end portion side than the one end portion, of the inner surface of the long hole; and a catching/releasing surface that is an outer peripheral surface of the fourth rotation shaft that, when the seatback is in the state of usage, faces the retainer projection in the length direction and restricts movement of the fourth rotation shaft further toward the other end portion side than the retainer projection, and, when the seatback transitions from the state of usage to the stored state in a state in which the fourth rotation shaft is positioned at the one end portion, does not face the retainer projection in the length direction and permits movement of the fourth rotation shaft further toward the other end portion side than the retainer projection.

In accordance with the vehicle seat of the third aspect of the present disclosure, the movement restricting portion includes the retainer projection that is provided at the inner surface of the long hole, and the catching/releasing surface that is the outer peripheral surface of the fourth rotation shaft. Therefore, the structure of the movement restricting portion can be made to be more simple, as compared with a case in which the movement restricting portion is structured by members, which is manufactured as a body separate from the cushion frame and the fourth rotation shaft, being mounted to at least one of the cushion frame or the fourth rotation shaft.

In a vehicle seat relating to a fourth aspect of the present disclosure, in the vehicle seat of the third aspect, the catching/releasing surface includes: a restricting surface whose cross-sectional shape cut in a plane orthogonal to the fourth rotation shaft is an arc, and that, when the seatback is in the state of usage, faces the retainer projection in the length direction and restricts movement of the fourth rotation shaft further toward the other end portion side than the retainer projection; and a permitting surface whose both end portions in a peripheral direction whose center is the fourth rotation shaft is connected to the restricting surface, and that, when the seatback transitions from the state of usage to the stored state in the state in which the fourth rotation shaft is positioned at the one end portion, permits movement of the fourth rotation shaft further toward the other end portion side than the retainer projection, while facing the retainer projection in a width direction of the long hole.

In the vehicle seat of the fourth aspect of the present disclosure, the catching/releasing surface includes the restricting surface and the permitting surface. The cross-sectional shape, which is cut in a plane orthogonal to the fourth rotation shaft, of the restricting surface is arc. When the seatback is in the state of usage, the restricting surface face the retainer projection in the length direction and restricts movement of the fourth rotation shaft further toward the other end portion side of the long hole than the retainer projection. When the seatback transitions from the state of usage to the stored state in the state in which the fourth rotation shaft is positioned at the one end portion, the permitting surface permits movement of the fourth rotation shaft further toward the other end portion side of the long hole than the retainer projection, while facing the retainer projection in the width direction of the long hole. The permitting surface is a surface whose both end portions in the peripheral direction whose center is the fourth rotation shaft are connected to the restricting surface. In this way, the shape of the outer peripheral surface (the catching/releasing surface) of the fourth rotation shaft that is structural element of the movement restricting portion is simple shape that is formed from arc-shaped surface and surface that connects the both end portions of the arc-shaped surface. Therefore, the structure of the fourth rotation shaft is simple. Accordingly, in the fourth aspect of the present disclosure, the structure of the movement restricting portion can be made simpler.

In a vehicle seat relating to a fifth aspect of the present disclosure, in the vehicle seat of the fourth aspect, an end surface at the one end portion side of the inner surface of the long hole is a first end surface that is arc-shaped, and when the fourth rotation shaft is positioned at the one end portion, the restricting surface faces the first end surface.

In the vehicle seat of the fifth aspect of the present disclosure, when the fourth rotation shaft is positioned at the one end portion of the long hole, the arc-shaped restricting surface of the fourth rotation shaft faces the arc-shaped first end surface that is the end surface at the one portion side of the inner surface of the long hole. Therefore, when the seatback rotates in the state in which the fourth rotation shaft is positioned at the one end portion of the long hole, the frictional force between the outer peripheral surface of the fourth rotation shaft and the inner surface of the long hole is small. Therefore, when the fourth rotation shaft is positioned at the one end portion of the long hole, the seatback can rotate smoothly. Moreover, the outer peripheral surface of the fourth rotation shaft and the first end surface of the long hole are hardly worn.

In a vehicle a vehicle seat relating to a sixth aspect of the present disclosure, in the vehicle seat of the fourth aspect, an end surface at the other end portion side of the inner surface of the long hole is a second end surface that is arc-shaped, and when the fourth rotation shaft is positioned at the other end portion, the restricting surface faces the second end surface.

In accordance with the vehicle seat of the sixth aspect of the present disclosure, when the fourth rotation shaft is positioned at the other end portion of the long hole, the arc-shaped restricting surface of the fourth rotation shaft faces the arc-shaped second end surface that is the end surface at the other end portion side of the inner surface of the long hole. Therefore, when the seatback rotates in the state in which the fourth rotation shaft is positioned at the other end portion of the long hole, the frictional force between the outer peripheral surface of the fourth rotation shaft and the inner surface of the long hole is small.

Therefore, when the fourth rotation shaft is positioned at the other end portion of the long hole, the seatback can rotate smoothly. Moreover, the outer peripheral surface of the fourth rotation shaft and the second end surface of the long hole are hardly worn.

In a vehicle seat relating to a seventh aspect of the present disclosure, in the vehicle seat of the first aspect, the seat cushion that is in the state of usage enters into the stored state by moving toward a front and lower side, and a shape of the long holes when the cushion frame is viewed in the vehicle transverse direction is an arc shape that is convex toward a lower side.

In accordance with the vehicle seat of the seventh aspect of the present disclosure, the amount of movement, toward the lower side, of the seat cushion at the time when the seat cushion that is in the state of usage rotates in the direction of entering into the stored state is small.

As described above, in accordance with the vehicle seat relating to the present disclosure, although the vehicle seat has a small number of parts and a simple structure, it can be configured such that the position of a seat cushion does not change at the time when rotation locking mechanisms are in locking states and a vehicle occupant sits-down on the seat cushion.

BRIEF DESCRIPTION OF THE DRAWINGS

Exemplary embodiments of the present invention will be described in detail based on the following figures, wherein.

DETAILED DESCRIPTION

A vehicle seat 10 (hereinafter referred to as seat 10) relating to an embodiment of the present disclosure is described hereinafter by using FIG. 1 through FIG. 13. Note that arrow FR that is shown appropriately in the respective drawings indicates the vehicle frontward direction, and arrow UP indicates the vehicle upward direction. Hereinafter, when description is given by merely using longitudinal, left-right and vertical directions, they refer to the longitudinal of the vehicle longitudinal direction, the left and right of the vehicle left-right direction (the vehicle transverse direction), and upward and downward in the vehicle vertical direction, unless otherwise specified.

Figure 1:
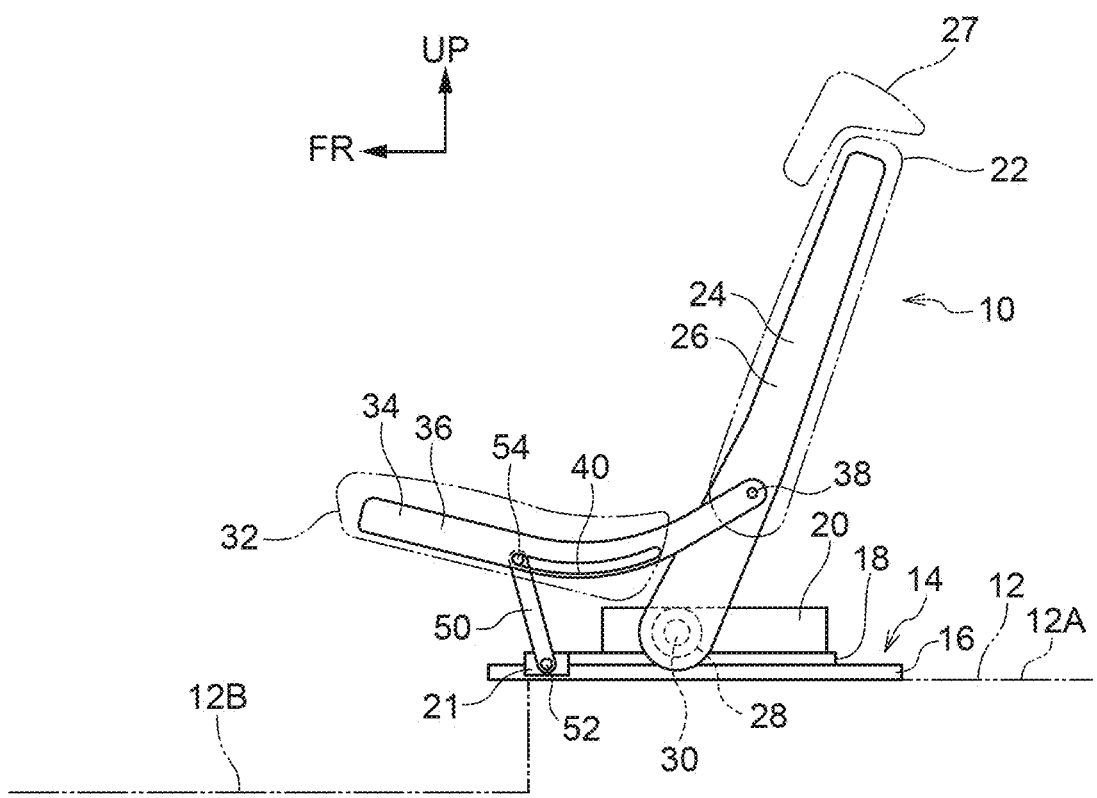
FIG. 1 is a left side view at a time when a seatback of a vehicle seat relating to an embodiment of the present disclosure is positioned at a reference usage position.
Figure 3:
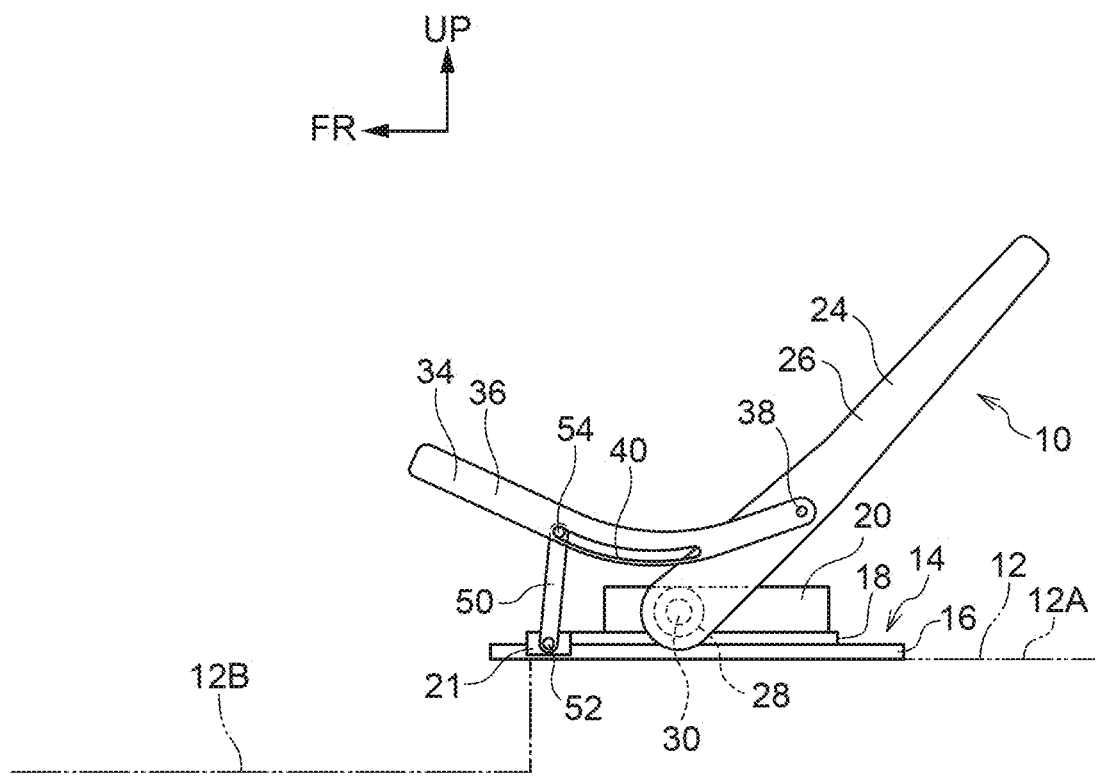
FIG. 3 is a left side view at a time when the seatback of the vehicle seat shown in FIG. 1 is positioned at a rear end position.

The seat 10 relating to the present embodiment is a seat for seating of a single person in the second row or the third row of a vehicle (not illustrated) such as a minivan or the like for example. The seat 10 is mounted to a seat setting surface 12A of a vehicle floor 12 with the seat 10 being in a posture in which the longitudinal, left-right and vertical directions thereof coincide with the longitudinal, left-right and vertical directions of the vehicle. As shown in FIG. 1, FIG. 3 and the like, a recess 12B that is positioned directly in front of the seat setting surface 12A is provided in the vehicle floor 12.

A slide rail device 14 is provided at the seat setting surface 12A. The slide rail device 14 includes a pair of left and right lower rails 16 that are fixed to the seat setting surface 12A and extend in the longitudinal direction, a pair of left and right upper rails 18 that are slidably supported at the respective lower rails 16, and slide locking mechanisms (not illustrated) that can fix the longitudinal direction positions of the upper rails 18 at an arbitrary position.

First base members 20 (base members) and second base members (base members) 21 that are both made of metal are fixed to the left and right upper rails 18. Namely, the first base members 20 and the second base members 21 are supported at the vehicle floor 12 via the slide rail device 14.

The seat 10 includes a seatback 22 and a seat cushion 32. A back frame 24, which is made of metal and is the frame member of the seatback 22, is provided at the interior of the seatback 22. The back frame 24 includes a pair of left and right side frames 26, an upper frame (not illustrated) that connects the upper end portions of the left and right side frames 26 together, and a lower frame (not illustrated) that connects the lower portions of the left and right side frames 26 together. A headrest 27 is supported at the upper end portion of the seatback 22 (see FIG. 1).

The lower end portions of the left and right side frames 26 are connected to the left and right first base members 20 via known reclining mechanisms 28 (refer to FIG. 1 and the like). Namely, the back frame 24 (the side frames 26) can rotate, with respect to the first base members 20, around first rotation shafts 30 that are the rotation center shafts of the reclining mechanisms 28 (the rotation locking mechanisms) and that extend in the left-right direction. The left and right reclining mechanisms 28 are coaxial to one another. The left and right reclining mechanisms 28 are connected via linking mechanisms (not shown) to an operation lever (not illustrated) that is rotatably provided at the seat 10. When the operation lever is positioned at its initial position, the respective reclining mechanisms 28 are in locking states, and the rotation direction position of the back frame 24 with respect to the first base members 20 is fixed by the reclining mechanisms 28. When the operation lever is rotated from the initial position to an operated position, the respective reclining mechanisms 28 enter into unlocking states. Therefore, the back frame 24 can rotate in the clockwise direction and the counterclockwise direction, relative to the first base members 20. Note that "clockwise direction" and "counterclockwise direction" that are used in describing the "rotates in the clockwise direction" and "rotates in the counterclockwise direction" in the present specification are directions when the seat 10 is viewed from the left side.

A cushion frame 34, which is made of metal and is the frame member of the seat cushion 32, is provided at the interior of the seat cushion 32. The cushion frame 34 includes a pair of left and right side frames 36, a front frame (not illustrated) that connects the front end portions of the left and right side frames 36 together, and a rear frame (not illustrated) that connects the rear portions of the left and right side frames 36 together.

Figure 2:
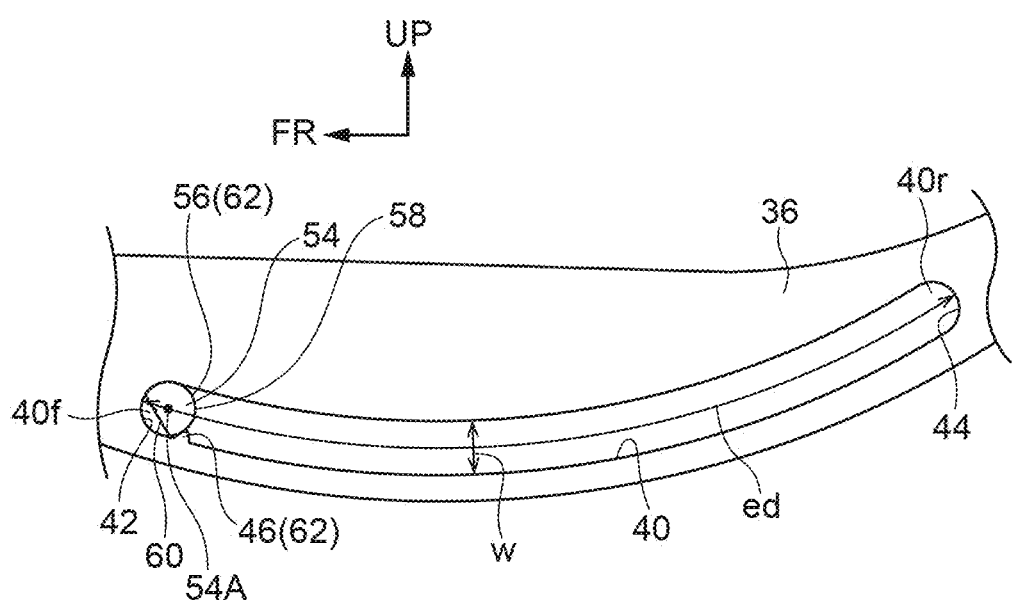
FIG. 2 is a left side view for showing the positional relationship between a long hole that is formed in a side frame of a cushion frame, and a fourth rotation shaft that is fixed to a link member, of the vehicle seat shown in FIG. 1.
Figure 4:
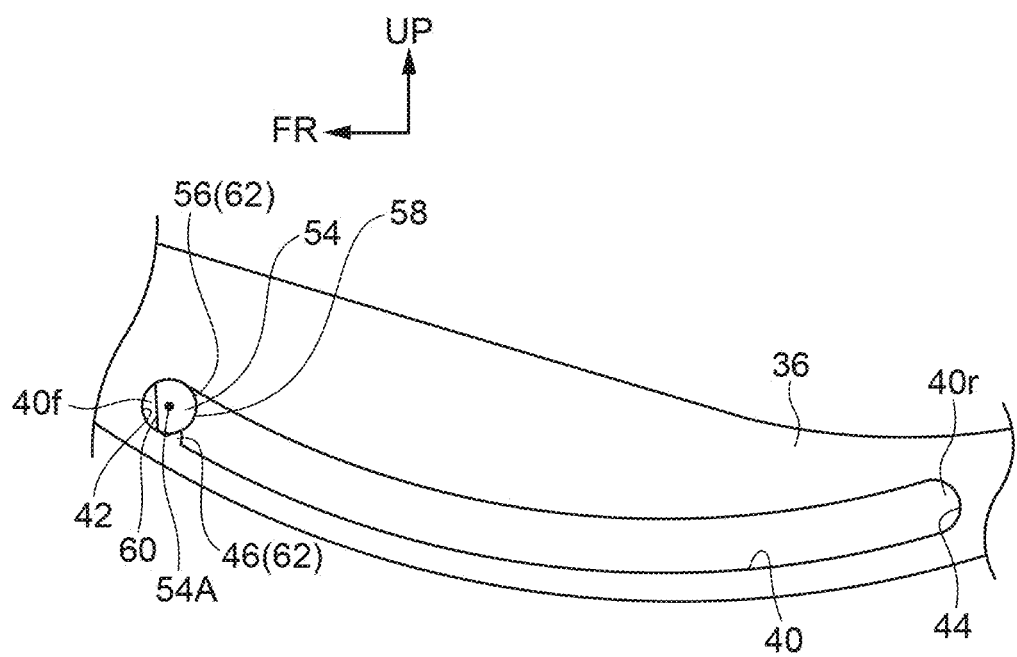
FIG. 4 is a left side view for showing the positional relationship between the long hole and the fourth rotation shaft of the vehicle seat shown in FIG. 3.

Portions of the left and right side frames 26 are positioned between the rear end portions of the left and right side frames 36. The left and right side frames 36 are rotatably connected to the left and right side frames 26 via second rotation shafts 38 that extend in the left-right direction. As shown in FIG. 2, FIG. 4 and the like, long holes 40 are formed as through-holes in the left and right side frames 36. The shapes, as seen in side view, of the long holes 40 when the side frames 36 are viewed in the left-right direction are arc shapes that are convex toward the lower side. These arc shapes may be exact arc shapes, or may be substantial arc shapes. Substantial arc-shapes also are included as the "arc shapes" of the claims. Length direction ed (refer to the arrow in FIG. 2) of the long holes 40 is a direction that runs along the longitudinal direction. When the seat 10 is in the state shown in FIG. 1 and FIG. 2, the central portion of length direction ed of the long holes 40 is positioned further toward the lower side than the both end portions. The front end surfaces of the long holes 40 are first end surfaces 42 whose shapes as seen in side view are arc shapes, and the rear end surfaces of the long holes 40 are second end surfaces 44 whose shapes as seen in side view are arc shapes. The curvatures of the first end surfaces 42 and the second end surfaces 44 are the same. Retainer projections 46 that are directed upward are provided integrally at positions, which are apart slightly rearward from the first end surfaces 42, of the bottom portions of the inner surfaces of the long holes 40. Namely, for example, in a case in which the side frames 36 are manufactured by press molding, the retainer projections 46 are manufactured simultaneously with the side frames 36. Width w (the dimension in the short-side direction that is orthogonal to the length direction ed, refer to the arrow in FIG. 2) of the long holes 40 is substantially constant. However, width w1 (see FIG. 8) of the regions, at which the retainer projections 46 are provided, of the long holes 40 is narrower than width w2 (see FIG. 8) of the regions which are other than the regions at which the retainer projections 46 are provided.

A pair of left and right link members 50 that are made of metal are connected to the left and right second base members 21. Length direction one end portions of the left and right link members 50 are rotatably connected to the left and right second base members 21 via third rotation shafts 52 that extend in the left-right direction.

Fourth rotation shafts 54 that are made of metal and extend in the left-right direction are fixed to the other end portions of the left and right link members 50. As shown in FIG. 2, FIG. 4 and the like, catching/releasing surfaces 56 that are the outer peripheral surfaces of the fourth rotation shafts 54 have restricting surfaces 58 and permitting surfaces 60. The restricting surfaces 58 are portions of cylindrical surfaces whose centers are axes 54A that extend in the left-right direction of the fourth rotation shafts 54. Namely, the cross-sectional shapes of the restricting surfaces 58 when cut in a plane orthogonal to the axes 54A are arcs. The central angle, whose center is the axis 54A, of this arc (cylindrical surface) is greater than 180°. Moreover, given that the radius of curvature, whose center is the axis 54A, of the restricting surface 58 is r, width w1<2r<width w2. The permitting surfaces 60 are flat surfaces that are parallel to the axes 54A. However, the permitting surfaces 60 do not have to be flat surfaces. Both end portions in the peripheral direction, whose center is the axes 54A, of the permitting surfaces 60 are connected to the both end portions in the peripheral direction of the restricting surfaces 58, respectively. The retainer projections 46 of the long holes 40 and the catching/releasing surfaces 56 of the fourth rotation shafts 54 are structural elements of movement restricting portions 62.

The left and right fourth rotation shafts 54 are inserted in the long holes 40 of the left and right side frames 36, respectively. The fourth rotation shafts 54 are inserted in the long holes 40 so as to be able to move relatively in the length direction ed and so as to be able to rotate around the axes 54A.

As described above, the side frames 26 are connected to the first base members 20 so as to be able to rotate around the first rotation shafts 30. The side frames 36 are connected to the side frames 26 so as to be able to rotate around the second rotation shafts 38. The link members 50 are connected to the side frames 36 (the long holes 40) so as to be able to rotate around the fourth rotation shafts 54, and the link members 50 are connected to the second base members 21 so as to be able rotate around the third rotation shafts 52. Therefore, when the reclining mechanisms 28 are in the unlocking states, the side frames 36 and the link members 50 rotate interlockingly with rotation of the side frames 26.

(Operation and Effects)

Operation and effects of the present embodiment are described next.

When the side frames 26 (the seatback 22) are positioned at the reference usage position shown in FIG. 1, the side frames 36 (the seat cushion 32) are positioned at the reference seating position shown in FIG. 1, and the link members 50 are positioned at the position shown in FIG. 1. At this time, as shown in FIG. 2, the fourth rotation shafts 54 are positioned at front end portions 40f that are one end portions in the length direction ed of the long holes 40, and portions of the restricting surfaces 58 face the first end surfaces 42 of the long holes 40 while contacting them or with slight gaps formed therebetween. Further, other portions of the restricting surfaces 58 face the retainer projections 46 of the long holes 40 in the length direction ed while contacting them or with slight gaps formed therebetween. Therefore, when the reclining mechanisms 28 are in the locking states and the seat 10 is in the state of FIG. 1, the fourth rotation shafts 54 riding-over the retainer projections 46 and moving within the long holes 40 toward the rear side is restricted by the retainer projections 46 and the restricting surfaces 58.

Under the state where the reclining mechanisms 28 are in the unlocking states, when the side frames 26 are rotated from the reference usage positions toward the rear side to as far as the rear end position shown in FIG. 3, the side frames 36 and the link members 50 rotate to as far as the positions shown in FIG. 3. When the side frames 26 rotate from the reference usage positions to the rear end positions, as shown in FIG. 4, the fourth rotation shafts 54 rotate in the clockwise direction around the axes 54A at the front end portions 40f of the long holes 40. As shown in FIG. 4, at this time, portions of the restricting surfaces 58 face the retainer projections 46 in the length direction ed so as to contact them or with slight gaps formed therebetween. Moreover, other portions of the restricting surfaces 58 face the first end surfaces 42 while contacting them or with slight gaps formed therebetween. Therefore, at the time when the seat 10 is in the state of FIG. 3, the fourth rotation shafts 54 moving forward relative to the long holes 40 is restricted by the first end surfaces 42 and the restricting surfaces 58. Accordingly, rotation of the side frames 26 toward the rear side from the rear end positions is restricted by the first end surfaces 42 and the restricting surfaces 58. At the time when the seatback 22 (the side frames 26) rotates in a rotation region that is between the reference usage position and the rear end position, the seatback 22 and the seat cushion 32 are in states of usage.

Figure 5:
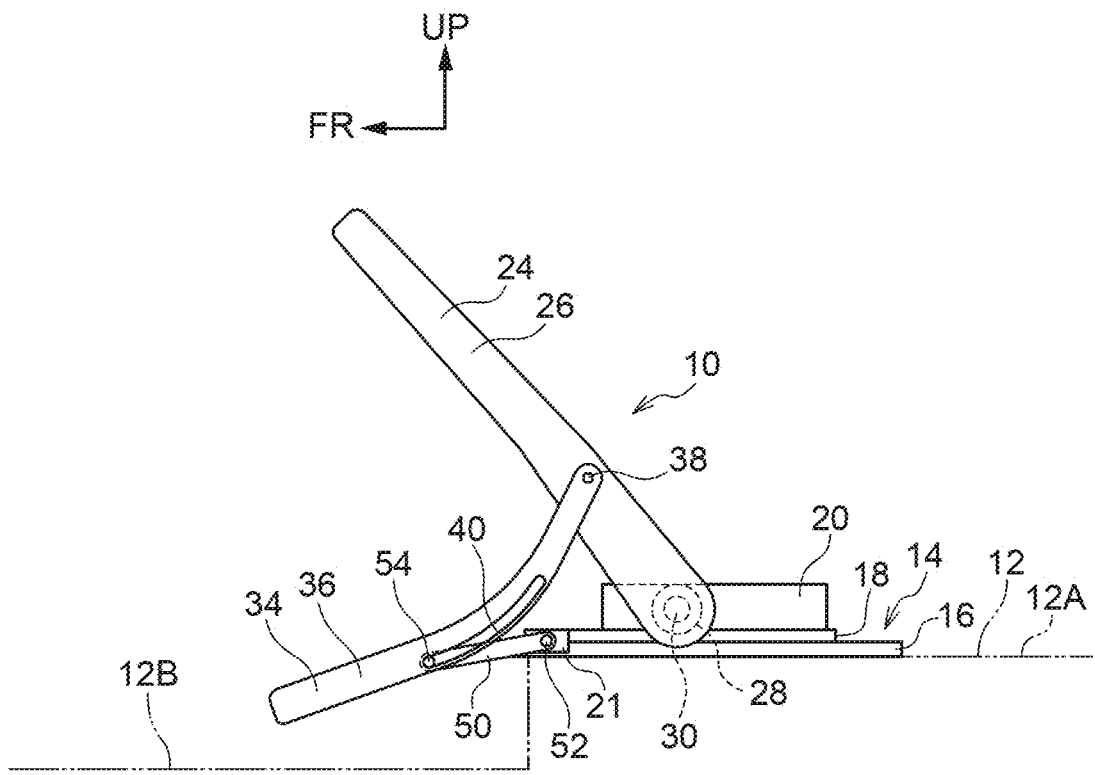
FIG. 5 is a left side view at a time when the seatback of the vehicle seat shown in FIG. 1 is positioned at a folding-over start position.
Figure 6:
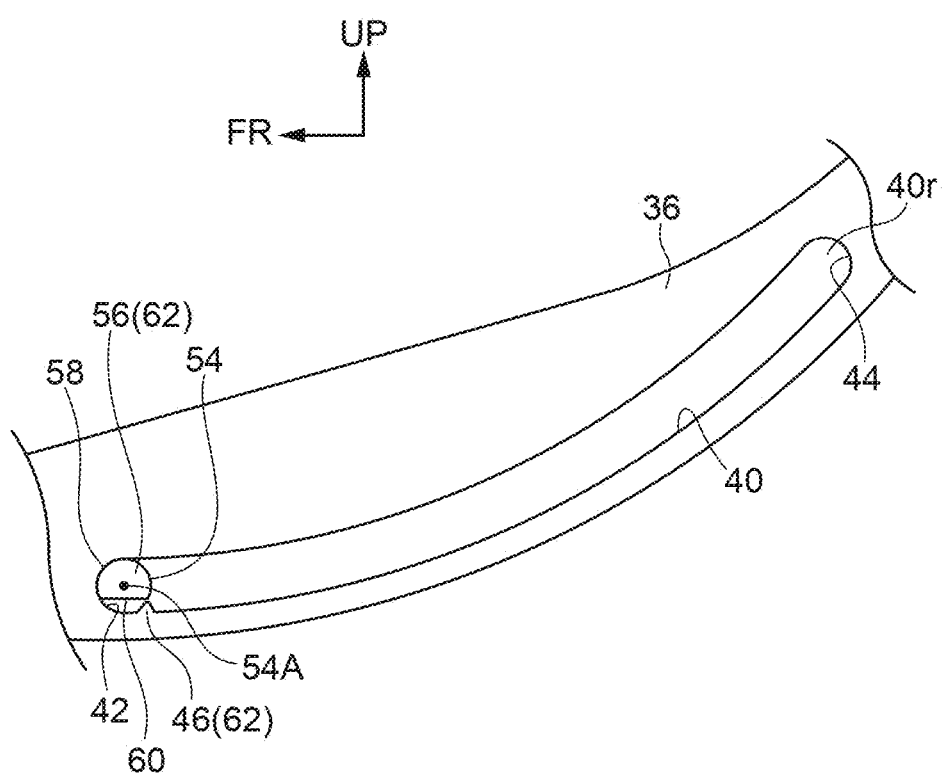
FIG. 6 is a left side view for showing the positional relationship between the long hole and the fourth rotation shaft of the vehicle seat shown in FIG. 5.

When the side frames 26 rotate toward the front side from the reference usage position to as far as the folding-over start position shown in FIG. 5, the side frames 36 and the link members 50 rotate to as far as the positions shown in FIG. 5. When the side frames 26 rotate from the reference usage positions to the folding-over start positions, as shown in FIG. 6, the fourth rotation shafts 54 rotate in the counter-clockwise direction around the axes 54A at the front end portions 40f. At this time, the restricting surfaces 58 are positioned further toward the upper side than the retainer projections 46. Namely, the restricting surfaces 58 do not face the retainer projections 46 in the length direction ed. Therefore, when the seat 10 is in the state of FIG. 5, the fourth rotation shafts 54 can move toward the rear side in the spaces above the retainer projections 46 (the interiors of the long holes 40).

The range of rotation of the seatback 22 (the back frame 24) at the time of rotating between the rear end position (FIG. 3) and the folding-over start position (FIG. 5) is referred to as the "first rotation region". Further, the range of rotation of the seat cushion 32 (the cushion frame 34) at the time of rotating between the position of FIG. 3 and the position of FIG. 5 is referred to as the "second rotation region". As described above, when the reclining mechanisms 28 are in the unlocking states and the fourth rotation shafts 54 are positioned at the front end portions 40f of the long holes 40, the seatback 22 (the back frame 24) can rotate in the first rotation region, and the seat cushion 32 (the cushion frame 34) can rotate in the second rotation region.

When the reclining mechanisms 28 are in the locking states and the fourth rotation shafts 54 are positioned at the front end portions 40f of the long holes 40, rotation of the side frames 26 around the first rotation shafts 30 is restricted by the reclining mechanisms 28. In this state, when external force around the second rotation shafts 38 is applied to the seat cushion 32, the side frames 36 (the long holes 40) and the link members 50 (the fourth rotation shafts 54) attempt to rotate relative to one another. However, relative movement of the fourth rotation shafts 54 toward the front side with respect to the long holes 40 is restricted by the restricting surfaces 58 and the first end surfaces 42, and relative movement of the fourth rotation shafts 54 toward the rear side with respect to the long holes 40 is restricted by the restricting surfaces 58 and the retainer projections 46. Therefore, even if external force around the second rotation shafts 38 is applied to the seat cushion 32, the angle of the seat cushion 32 with respect to the seatback 22 does not change. Namely, when the reclining mechanisms 28 are in the locking states and the fourth rotation shafts 54 are positioned at the front end portions 40f, rotations of the side frames 26, the side frames 36 and the link members 50 are restricted. Accordingly, even if a vehicle occupant (not illustrated) sits-down on the seat cushion 32 that is positioned at an arbitrary rotational position in the second rotation range, the rotational positions of the seat cushion 32 and the seatback 22 do not change. For example, even if a vehicle occupant (not illustrated) sits-down on the seat cushion 32 that is positioned at the reference seating position shown in FIG. 1, the seat cushion 32 is maintained at the reference seating position, and the seatback 22 is maintained at the reference usage position.

Figure 7:
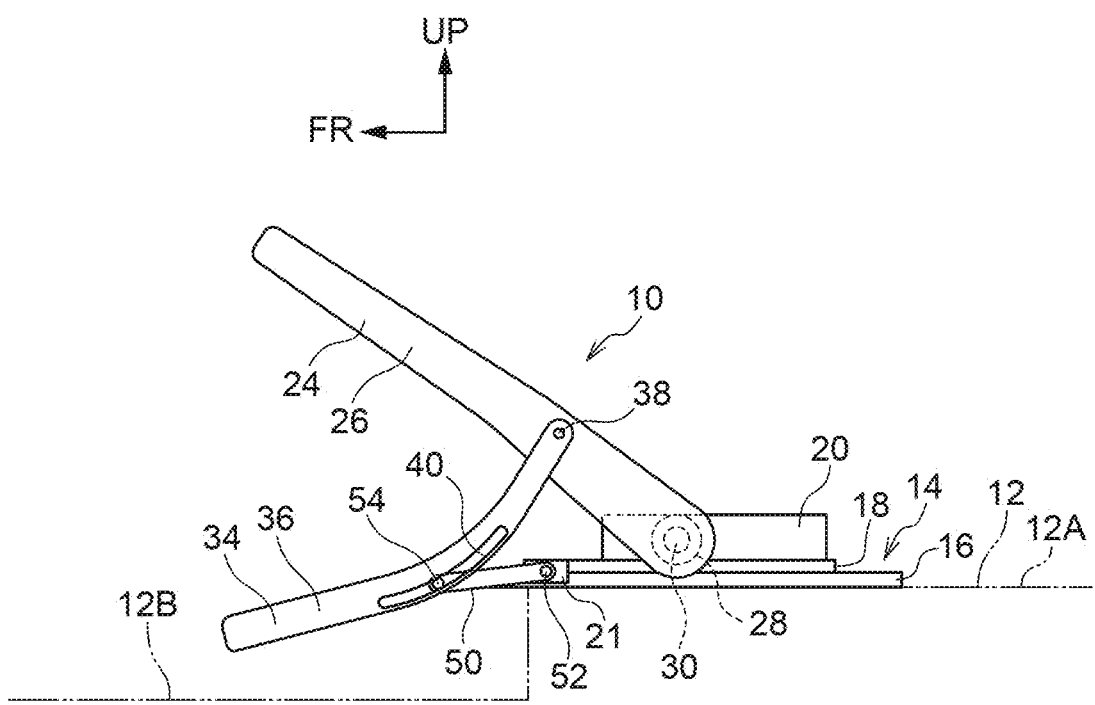
FIG. 7 is a left side view at a time when the seatback of the vehicle seat shown in FIG. 1 is rotated forward from the folding-over start position.
Figure 8:
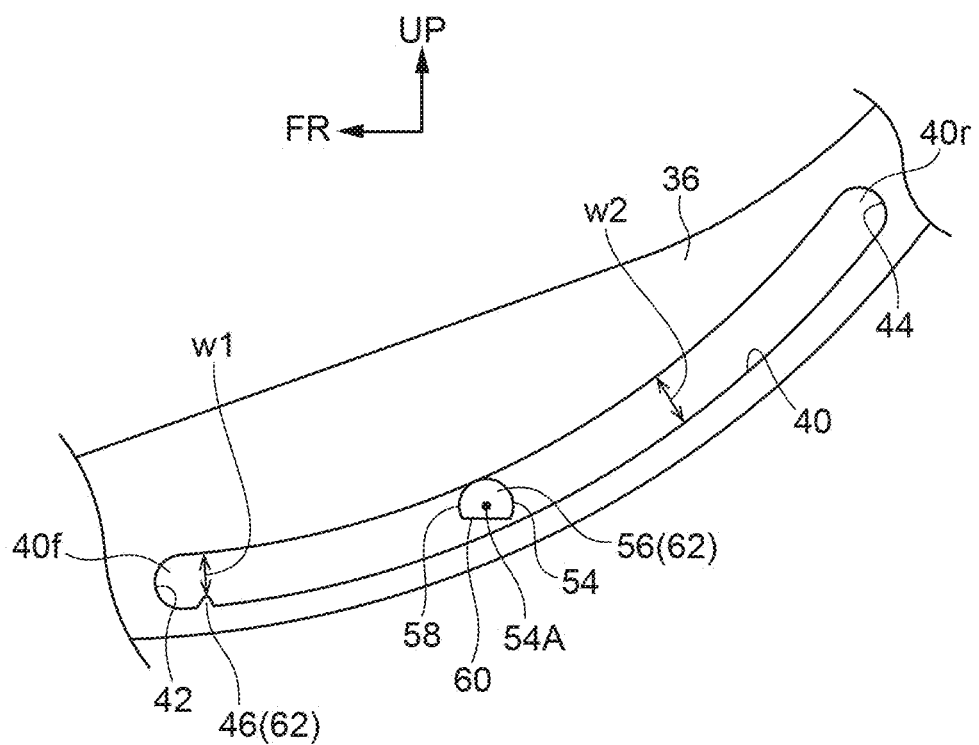
FIG. 8 is a left side view for showing the positional relationship between the long hole and the fourth rotation shaft of the vehicle seat shown in FIG. 7.

Under the state where the reclining mechanisms 28 are in the unlocking states, when the side frames 26 rotate toward the front side from the folding-over start positions to as far as the position shown in FIG. 7, the side frames 36 and the link members 50 rotate to as far as the positions shown in FIG. 7. When the side frames 26 rotate from the folding-over start positions to the position shown in FIG. 7, the fourth rotation shafts 54 move toward the rear side in the long holes 40 with the positions thereof in the direction of rotating around the axes 54A hardly changing at all. Namely, the permitting surfaces 60 pass toward the rear side through the spaces above the retainer projections 46 in states of facing the retainer projections 46 in the width w direction. Therefore, as shown in FIG. 8, the fourth rotation shafts 54 move to as far as vicinities of the central portions in the length direction ed of the long holes 40. Therefore, as shown in FIG. 7, the side frames 36 rotate further toward the lower side than the position of FIG. 5, and the link members 50 rotate in the counterclockwise direction from the position of FIG. 5 around the third rotation shafts 52.

Figure 9:
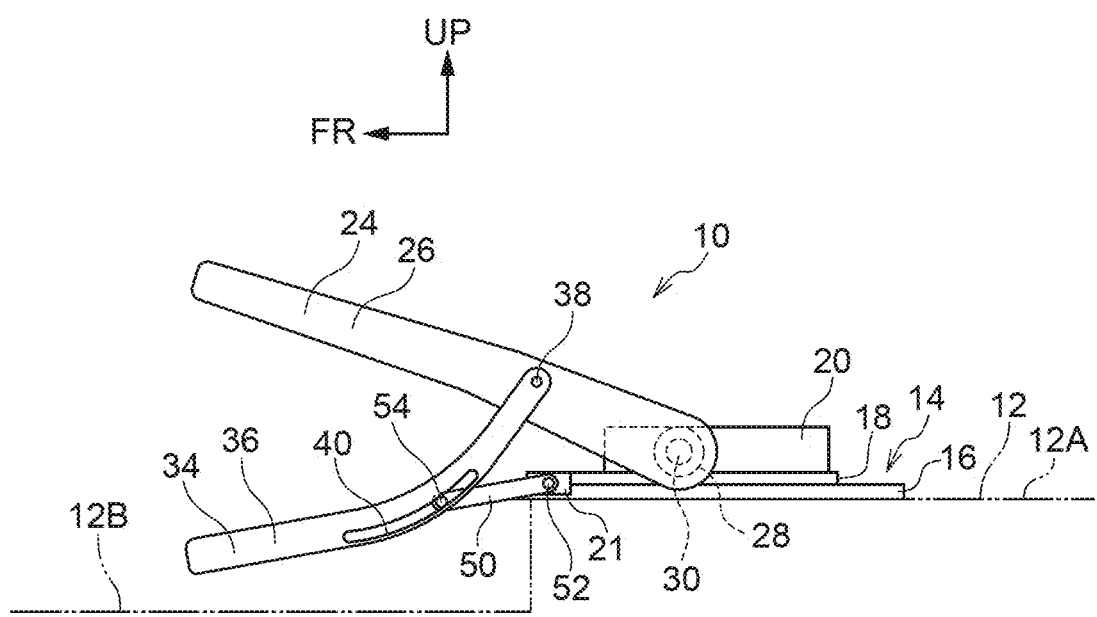
FIG. 9 is a left side view at a time when the seatback of the vehicle seat shown in FIG. 1 is rotated forward from the position of FIG. 7.
Figure 10:
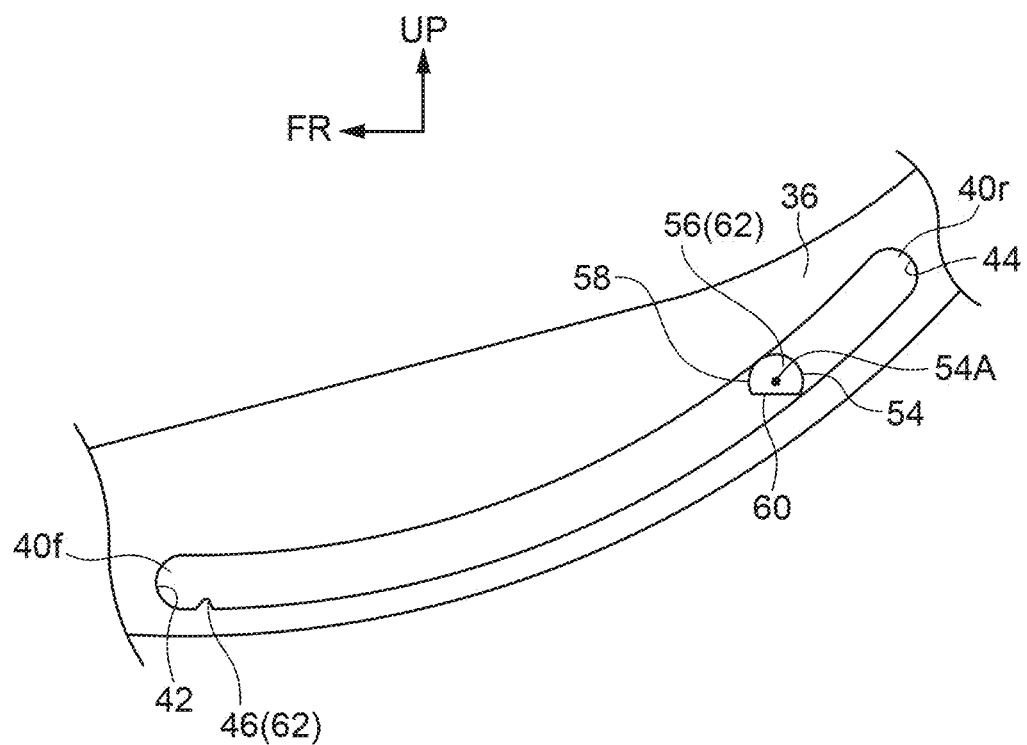
FIG. 10 is a left side view for showing the positional relationship between the long hole and the fourth rotation shaft of the vehicle seat shown in FIG. 9.

Moreover, under the state where the reclining mechanisms 28 are in the unlocking states, when the side frames 26 rotate toward the front side from the position shown in FIG. 7 to as far as the position shown in FIG. 9, the side frames 36 and the link members 50 rotate to as far as the positions shown in FIG. 9. When the side frames 26 rotate to the position shown in FIG. 9, as shown in FIG. 10, the fourth rotation shafts 54 move toward the rear side through the long holes 40 with the positions thereof in the direction of rotating around the axes 54A hardly changing at all. Therefore, as shown in FIG. 9, the side frames 36 rotate further toward the lower side than the position of FIG. 7, and the link members 50 rotate in the counterclockwise direction from the position of FIG. 7 around the third rotation shafts 52.

Figure 11:
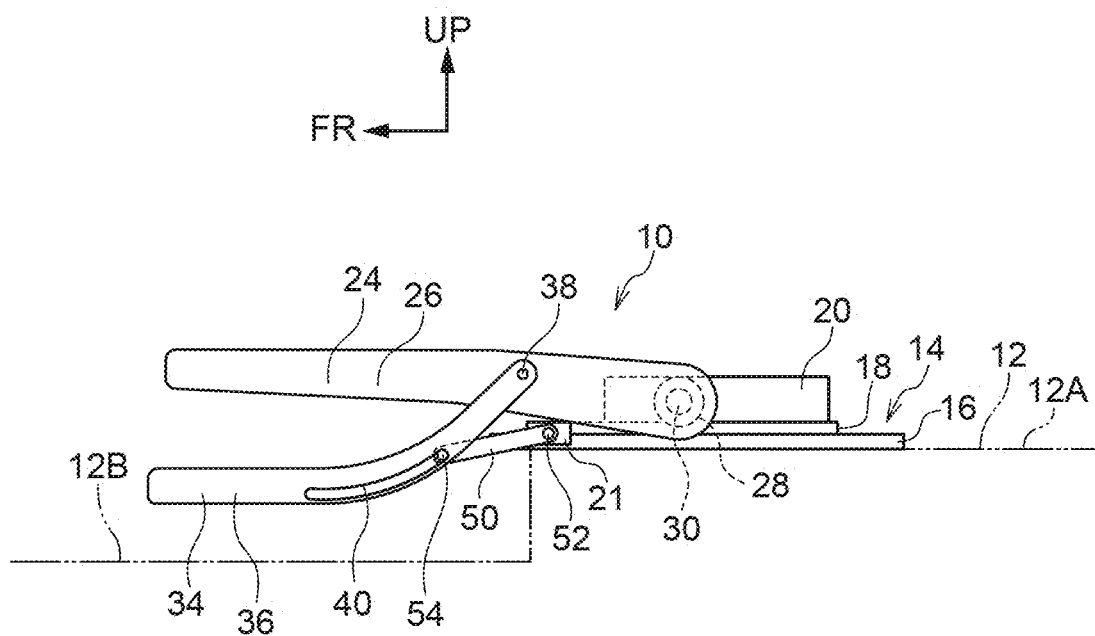
FIG. 11 is a left side view at a time when the seatback of the vehicle seat shown in FIG. 1 is positioned at a front end position.
Figure 12:
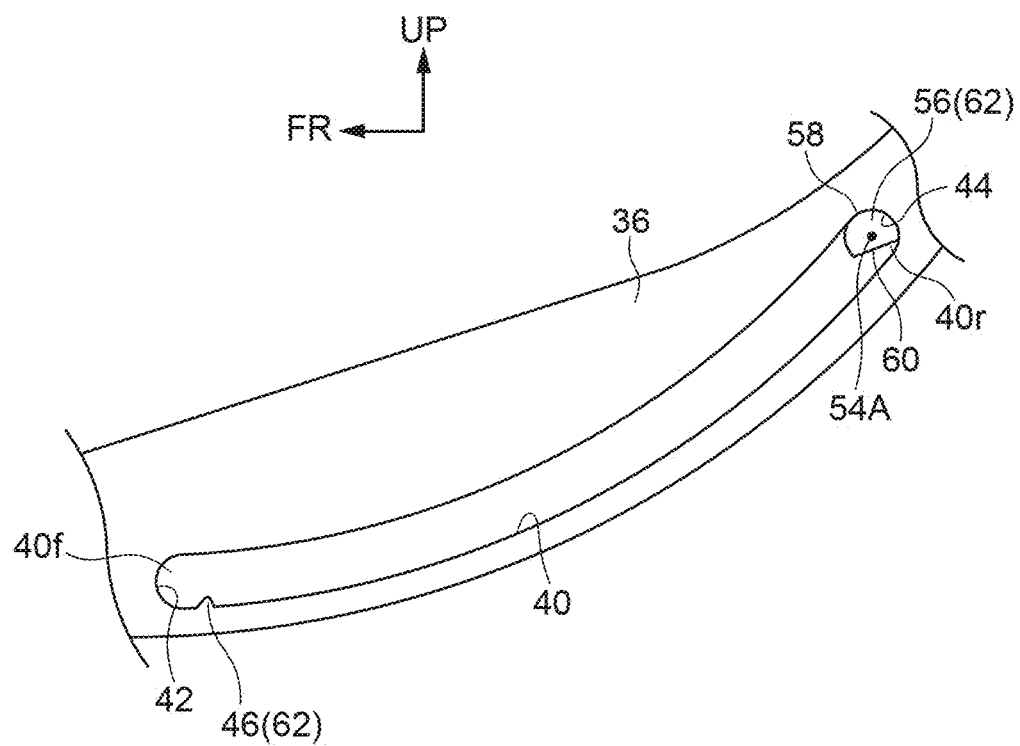
FIG. 12 is a left side view for showing the positional relationship between the long hole and the fourth rotation shaft of the vehicle seat shown in FIG. 11.

Under the state where the reclining mechanisms 28 are in the unlocking states, when the side frames 26 rotate toward the front side from the position shown in FIG. 9 to as far as the front end position shown in FIG. 11, the side frames 36 and the link members 50 rotate to as far as the positions shown in FIG. 11. When the side frames 26 rotate to the position shown in FIG. 11, as shown in FIG. 12, the fourth rotation shafts 54 move to as far as rear end portions 40r, which are the other end portions of the long holes 40, with the positions thereof in the direction of rotating around the axes 54A hardly changing at all. At this time, as shown in FIG. 11, the side frames 36 rotate slightly further toward the upper side than the position of FIG. 9, and the link members 50 rotate around the third rotation shafts 52 in the clockwise direction slightly from the position of FIG. 9. When the seatback 22 and the seat cushion 32 are positioned at the position shown in FIG. 11, the seatback 22 and the seat cushion 32 are in stored states.

At this time, as shown in FIG. 12, the restricting surfaces 58 of the fourth rotation shafts 54 face the second end surfaces 44 of the long holes 40 while contacting them or with slight gaps formed therebetween. Therefore, the fourth rotation shafts 54 cannot move toward the rear side within the long holes 40. Accordingly, rotation of the side frames 26 toward the front side from the front end positions is restricted by the second end surfaces 44 of the long holes 40 and the restricting surfaces 58 of the fourth rotation shafts 54. Further, in this state, when the reclining mechanisms 28 return to the locking states, rotations of the side frames 26, the side frames 36 and the link members 50 are restricted.

In this way, when the seatback 22 (the side frames 26) rotate toward the front side from the folding-over start position shown in FIG. 5 to as far as the position shown in FIG. 11, as shown in FIG. 5, FIG. 7, FIG. 9 and FIG. 11, the seat cushion 32 (the side frames 36) move from the position shown in FIG. 5 toward a front and lower side, and are stored in the recess 12B. Moreover, as shown in FIG. 11, the seatback 22 (the side frames 26) and the seat cushion 32 (the side frames 36) are substantially horizontal.

Under the state where the seat 10 is in the state of FIG. 11 and FIG. 12, when the seatback 22 (the side frames 26) is rotated toward the rear side by a predetermined angle with the reclining mechanisms 28 set in the unlocking states, the seat 10 returns to the state shown in FIG. 1 and FIG. 2. Then, in this state, when the reclining mechanisms 28 are switched to the locking states, the seatback 22 (the side frames 26) is maintained at the reference usage position, and the seat cushion 32 (the side frames 36) is maintained at the reference seating position.

At the above-described seat 10 of the present embodiment, when the reclining mechanisms 28 are in the locking states and the seatback 22 is positioned in the first rotation range, movement of the fourth rotation shafts 54, which are positioned at the front end portions 40f of the long holes 40, toward the rear end portion 40r sides is restricted by the movement restricting portions 62 (the catching/releasing surfaces 56 of the fourth rotation shafts 54 and the retainer projections 46 of the long holes 40). Accordingly, in a case in which the reclining mechanisms 28 are in the locking states, even if a vehicle occupant sits-down on the seat cushion 32 that is positioned at an arbitrary rotational position in the second rotation region, the rotational positions of the seat cushion 32 and the seatback 22 do not change.

Moreover, the retainer projections 46 that are structural elements of the movement restricting portions 62 are provided at the inner surfaces of the long holes 40, and the catching/releasing surfaces 56 that are structural elements of the movement restricting portions 62 are provided at the fourth rotation shafts. Therefore, the seat 10 has a small number of parts, and the structure of the seat 10 is simple.

Moreover, the movement restricting portions 62 includes the retainer projections 46 that are provided at the inner surfaces of the long holes 40, and the catching/releasing surfaces 56 that are the outer peripheral surfaces of the fourth rotation shafts 54. Therefore, the structure of the movement restricting portions 62 is simple as compared with a case in which the movement restricting portions 62 are structured by members, which are manufactured as bodies separate from the side frames 36 and the fourth rotation shafts 54, being mounted to at least one of the side frames 36 or the fourth rotation shafts 54.

Moreover, the shapes of the outer peripheral surfaces (the catching/releasing surfaces 56) of the fourth rotation shafts 54 that are structural elements of the movement restricting portions 62 are simple shapes that are formed from arc-shaped surfaces and surfaces that connect the both end portions of the arc-shaped surfaces. Therefore, the structures of the fourth rotation shafts 54 and the movement restricting portions 62 are simple.

Moreover, when the seatback 22 rotates in the first rotation region in the state in which the fourth rotation shafts 54 are positioned at the front end portions 40f of the long holes 40, the restricting surfaces 58 whose cross-sectional shapes are arcs face (contact) the arc-shaped first end surfaces 42. Therefore, when the seatback 22 rotates in the first rotation range in the state in which the fourth rotation shafts 54 are positioned at the front end portions 40f, the frictional force between the catching/releasing surfaces 56 of the fourth rotation shafts 54 and the inner surfaces of the long holes 40 is small. Therefore, when the fourth rotation shafts 54 are positioned at the front end portions 40f, the seatback 22 can rotate smoothly in the first rotation range, and the seat cushion 32 can rotate smoothly in the second rotation range. Moreover, the catching/releasing surfaces 56 of the fourth rotation shafts 54 and the first end surfaces 42 of the long holes 40 are hardly worn.

Moreover, when the fourth rotation shafts 54 are positioned at the rear end portions 40r of the long holes 40, the arc-shaped restricting surfaces 58 of the fourth rotation shafts 54 face (contact) the second end surfaces 44 of the long holes 40. Therefore, when the seatback 22 rotates toward the first rotation region side in the state in which the fourth rotation shafts 54 are positioned at the rear end portions 40r, the frictional force between the catching/releasing surfaces 56 of the fourth rotation shafts 54 and the inner surfaces of the long holes 40 is small. Therefore, when the seatback 22 rotates toward the first rotation region side in the state in which the fourth rotation shafts 54 are positioned at the rear end portions 40r, the seatback 22 can rotate smoothly toward the first rotation region side, and the seat cushion 32 can rotate smoothly toward the second rotation region side. Moreover, the catching/releasing surfaces 56 of the fourth rotation shafts 54 and the second end surfaces 44 of the long holes 40 are hardly worn.

Figure 13:
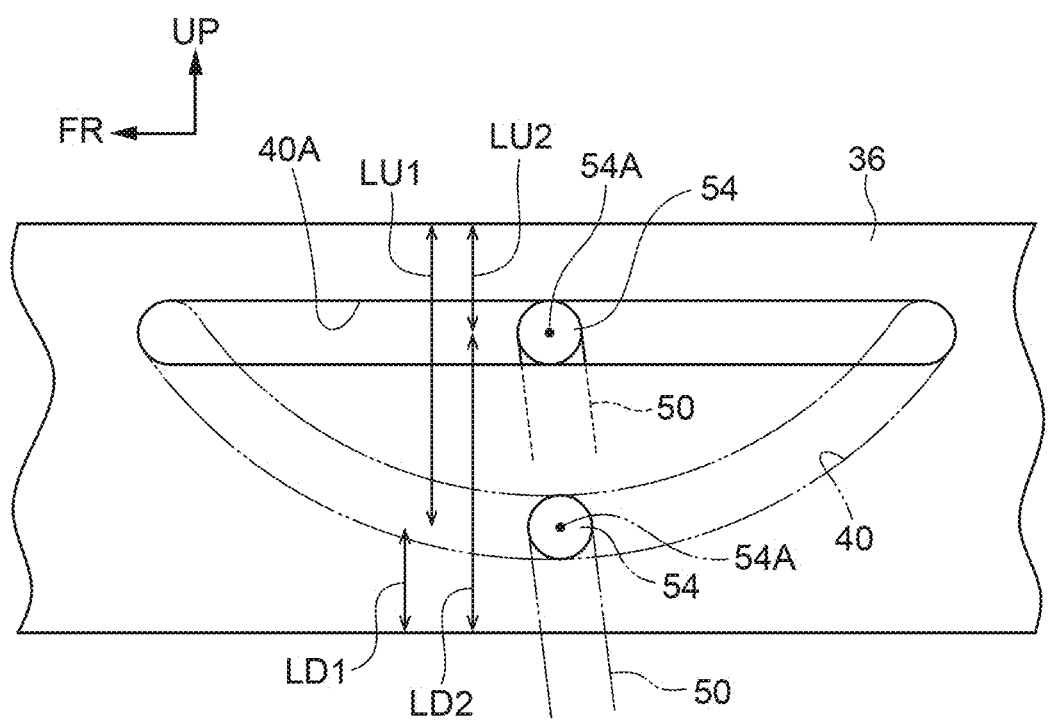
FIG. 13 is a schematic left side view of the side frame and the fourth rotation shaft for showing the positional relationship between a long hole and the fourth rotation shaft of a comparative example of the present disclosure.

By the way, long holes 40A that extend rectilinearly in the longitudinal direction are formed in the side frames 36 of a comparative example that is shown in FIG. 13, and the fourth rotation shafts 54 are inserted in these long holes 40A so as to be move freely. The long hole 40 that is shown by the imaginary lines in FIG. 13 is the long hole of the above-described embodiment. For convenience, in FIG. 13, illustration of the retainer projection 46 is omitted, and the cross-sectional shape of the fourth rotation shaft 54 is circular. When the seat 10 rotates between the position of FIG. 7 and the position of FIG. 9, the fourth rotation shafts 54 that are inserted in the long holes 40A and the fourth rotation shafts 54 that are inserted in the long holes 40 are both positioned at the position of FIG. 13. LU1 in FIG. 13 is the rectilinear distance from the axes 54A of the fourth rotation shafts 54 that are inserted in the long holes 40 to the upper edge portions of the side frames 36, and LD1 is the rectilinear distance from the axes 54A of the fourth rotation shafts 54 inserted in the long holes 40 to the lower edge portions of the side frames 36. LU2 in FIG. 13 is the rectilinear distance from the axes 54A of the fourth rotation shafts 54 that are inserted in the long holes 40A to the upper edge portions of the side frames 36, and LD2 is the rectilinear distance from the axes 54A of the fourth rotation shafts 54 inserted in the long holes 40A to the lower edge portions of the side frames 36.

The locus of rotation of the link members 50, to which are fixed the fourth rotation shafts 54 that are inserted in the long holes 40A, and the locus of rotation of the link members 50, to which are fixed the fourth rotation shafts 54 that are inserted in the long holes 40, are the same. Therefore, in actuality, when the seatback 22 rotates in a region of rotation (hereinafter referred to as front rotation region) that is further toward the front side than the first rotation region, the vertical direction position of the fourth rotation shafts 54 that are inserted in the long holes 40A and the vertical direction position of the fourth rotation shafts 54 that are inserted in the long holes 40 coincide with one another. Moreover, as illustrated, LU1>LU2, and LD1<LD2. Therefore, when the seatback 22 rotates in the front rotation region, the upper edge portions of the side frames 36 in which the long holes 40A are formed are positioned further toward the lower side than the upper edge portions of the side frames 36 in which the long holes 40 are formed. Moreover, when the seatback 22 rotates in the front rotation region, the lower edge portions of the side frames 36 in which the long holes 40A are formed are positioned further toward the lower side than the lower edge portions of the side frames 36 in which the long holes 40 are formed. Namely, when the seatback 22 rotates in the front rotation region, the side frames 36 in which the long holes 40A are formed are positioned at the lower side as compared with the side frames 36 in which the long holes 40 are formed. In other words, the amount of movement of the side frames 36, in which the long holes 40 are formed, toward the lower side at the time when the seatback 22 rotates from the first rotation region toward the front side is smaller as compared with that of the side frames 36 in which the long holes 40A are formed.

Therefore, when the seat 10 rotates to as far as the position shown in FIG. 9 and FIG. 10, the side frames 36 (the seat cushion 32) in which the long holes 40 are formed are positioned further toward the upper side than the side frames 36 (the seat cushion 32) in which the long holes 40A are formed. Therefore, in a case in which the long holes 40 are formed in the side frames 36, the depth of the recess 12B can be made to be smaller than in a case in which the long holes 40A are formed in the side frames 36.

Although an embodiment of the present disclosure has been described above, the present disclosure is not limited to this embodiment.

Figure 14:
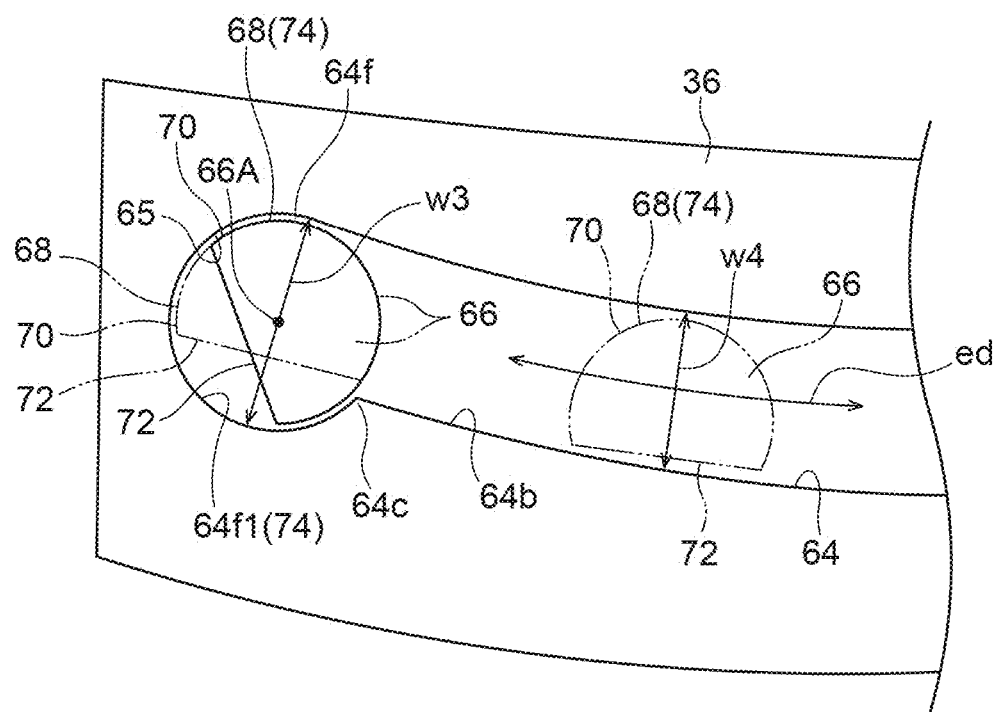
FIG. 14 is a left side view of the front portion of the side frame of the cushion frame and a fourth rotation shaft of a vehicle seat relating to a modified example of the present disclosure.

For example, the seat 10 may be embodied in the form of the modified example that is shown in FIG. 14. Long holes 64 are formed in the side frames 36 of this modified example. The shapes, as seen in side view, of the long holes 64 when the side frames 36 are viewed in the left-right direction are arc shapes that are convex toward the lower side. These arc shapes may be exact arc shapes, or may be substantial arc shapes. Substantial arc-shapes also are included as the "arc shapes" of the claims. The shapes, as seen in side view, of front end portions 64f, which are one end portions in the length direction ed of the long holes 64, are substantially circular. The front end surfaces of the long holes 64 are first end surfaces 65 whose shapes, as seen in side view, are arc shaped. Although not illustrated, second end surfaces that are arc-shaped are formed at the end surfaces of the rear end portions that are the other end portions in the length direction ed of the long holes 64. Width w3, which is the dimension in the width w direction of the front end portions 64f, is greater than width w4 that is the dimension in the width w direction of regions other than the front end portions 64f of the long holes 64. The width w4 of the regions other than the front end portions 64f of the long holes 64 is not constant. Namely, the width w4 becomes gradually larger from the front side toward the rear side. The connected portions of bottom surfaces 64b of the regions other than the front end portions 64f of the long holes 64, and lower portion inner surfaces 64f1 that are the inner surfaces of the lower portions of the front end portions 64f, are corner portions 64c. The lower portion inner surfaces 64f1 are positioned further toward the lower side than the corner portions 64c.

The catching/releasing surfaces 68 of fourth rotation shafts 66 of the present modified example include restricting surfaces 70 and permitting surfaces 72. The cross-sectional shapes of the restricting surfaces 70 when cut in a plane orthogonal to axes 66A of the fourth rotation shafts 66 are arcs. The central angle, whose center is the axis 66A, of this arc (cylindrical surface) is greater than 180°. Moreover, given that the radius of curvature whose center is the axis 66A of the restricting surface 70 is R, width w4<2R<width w3. The permitting surfaces 72 are flat surfaces that are parallel to the axes 66A. However, the permitting surfaces 72 do not have to be flat surfaces. The lower portion inner surfaces 64f1 of the long holes 64 and the catching/releasing surfaces 68 of the fourth rotation shafts 66 are structural elements of movement restricting portions 74.

When the seatback 22 (the side frames 26) rotates in the first rotation range, as shown in FIG. 14, the fourth rotation shafts 66 are positioned at the front end portions 64f, and portions of the restricting surfaces 70 face the first end surfaces 65 of the long holes 64 while contacting them or with slight gaps formed therebetween. Moreover, other portions of the restricting surfaces 70 face the lower portion inner surfaces 64f1 in the length direction ed of the long holes 64 while contacting them or with slight gaps formed therebetween. Note that the fourth rotation shaft 66 that is shown by the solid lines in FIG. 14 is the fourth rotation shaft 66 at the time when the seatback 22 (the side frames 26) is positioned at the reference usage position and the seat cushion 32 (the side frames 36) is positioned at the reference seating position. Further, the fourth rotation shaft 66 that is shown by the imaginary lines in FIG. 14 is the fourth rotation shaft 66 at the time when the seatback 22 (the side frames 26) is positioned at the folding-over start position.

Accordingly, when the reclining mechanisms 28 are in the locking states and the fourth rotation shafts 66 are positioned at the front end portions 64f, rotations of the side frames 26, the side frames 36 and the link members 50 are restricted. Therefore, for example, even if a vehicle occupant sits-down on the seat cushion 32 that is positioned at the reference seating position shown in FIG. 1, the seat cushion 32 of the present modified example is maintained at the reference seating position, and the seatback 22 is maintained at the reference usage position.

When the seatback 22 (the side frames 26) rotates from the folding-over start position toward the front side to as far as the position shown in FIG. 7 in the state in which the reclining mechanisms 28 are in the unlocking states, the seat cushion 32 (the side frames 36) and the link members 50 rotate to as far as the positions shown in FIG. 7. Therefore, the fourth rotation shafts 66 move toward the rear side in the long holes 64 while the positions thereof in the direction of rotating around the axes 66A hardly change at all from the position shown by the imaginary lines in FIG. 14. Namely, in the state in which the permitting surfaces 72 face the lower portion inner surfaces 64f1 and the corner portions 64c in the width w direction, the permitting surfaces 72 pass toward the rear side through the spaces above the lower portion inner surfaces 64f1 and the corner portions 64c. Therefore, as shown by the imaginary lines in FIG. 14, the fourth rotation shafts 66 move toward the central portion side in the length direction ed of the long holes 64. Therefore, the seat cushion 32 (the side frames 36) rotates further toward the lower side than the position of FIG. 5, and the link members 50 rotate in the counterclockwise direction from the position of FIG. 5 around the third rotation shafts 52.

When the seatback 22 (the side frames 26) rotates to as far as the front end position in the state in which the reclining mechanisms 28 are in unlocking states, the seat cushion 32 (the side frames 36) and the link members 50 rotate to as far as the positions shown in FIG. 11. At this time, the fourth rotation shafts 66 are positioned at the rear end portions (not shown) of the long holes 64, and portions of the restricting surfaces 70 face the second end surfaces so as to contact them or with slight gaps formed therebetween.

Further, the retainer projections 46 may be provided integrally at positions, which are slightly apart toward the front side from the second end surfaces 44, of the bottom portions of the inner surfaces in the length direction ed of the long holes 40 of the above-described embodiment, and the retainer projections 46 that are provided in vicinities of the front ends of the inner surfaces of the long holes 40 may be omitted. In this case, when the seatback 22 (the back frame 24) rotates in the first rotation region, the fourth rotation shafts 54 are positioned at the rear end portions 40r that are one end portions of the long holes 40. Further, when the seatback 22 (the back frame 24) is positioned at the front end position, the fourth rotation shafts 54 are positioned at the front end portions 40f that are the other end portions of the long holes 40.

Similarly, the rear end portions of the long holes 64 of the modified example shown in FIG. 14 may be made to be the same shapes as the front end portions 64f that are disclosed in FIG. 14, and the front end portions of the long holes 64 may be made to be the same shapes as the rear end portions of the modified example shown in FIG. 14. In this case, when the seatback 22 (the back frame 24) rotates in the first rotation range, the fourth rotation shafts 66 are positioned at the rear end portions that are one end portions of the long holes 64. Further, when the seatback 22 (the back frame 24) is positioned at the front end position, the fourth rotation shafts 66 are positioned at the front end portions that are the other end portions of the long holes 64.

The shapes, as seen in side view, of the long holes 40 and the long holes 64 may be rectilinear shapes that run along the vehicle longitudinal direction.

The retainer projections 46 may be fixed by welding or the like to the inner surfaces of the long holes 40, after the retainer projections 46 and the side frames 36 are manufactured separately.

The link members 50 and the fourth rotation shafts 54 may be molded integrally in states of being fixed to one another. For example, the link members 50 and the fourth rotation shafts 54 may be molded integrally by casting.

One of the left and right side frames 26 only may be connected to the first base member 20 via the reclining mechanism 28.

The side frames 26 and the link members 50 may be rotatably connected to a single base member.

The base members may be fixed to the vehicle floor 12.

The seat 10 may be a seat that has a vehicle transverse direction dimension that is such that plural persons can sit thereon in a row in the vehicle transverse direction.

The reclining mechanisms 28 that have locking functions may be omitted from the seat 10, and the side frames 26 (the back frame 24) and the first base members 20 (the base members) may be connected so as to be able to rotate around the first rotation shafts 30 that extend in the left-right direction. However, in this case, rotation locking mechanism (not illustrated), which switch between an unlocking state of permitting relative rotation of the side frames 26 with respect to the first base members 20 and locking states of restricting the relative rotation, are provided at the seat 10. For example, such rotation locking mechanism includes a striker provided at the vehicle body, a latch provided at the seatback 22, and a latch operation member that operates the latch. When the latch operation member is operated, the latch switches between a locking state (latched state) at which the latch can engage with the striker, and an unlocking state (unlatched state) at which the latch cannot engage with the striker. In a case in which the seatback 22 is in a state of usage, when the latch that is in locking state engage with the striker, the rotation direction position of the seatback 22 is maintained at a predetermined position. When the latch is in the unlocking state, the seatback 22 can rotate relative to the first base members 20.

The central angle, whose center is the axes 54A, of the restricting surfaces 58 when cut along a plane orthogonal to the axes 54A may be less than or equal to 180°. Similarly, the central angle, whose center is the axes 66A, of the restricting surfaces 70 when cut along a plane orthogonal to the axes 66A may be less than or equal to 180°.

What is claimed is:

1. A vehicle seat comprising:
   a base member supported at a vehicle floor;
   a back frame that is a frame member of a seatback and is connected to the base member so as to be able to rotate around a first rotation shaft that extends in a vehicle transverse direction;
   a rotation locking mechanism that switches between an unlocking state of permitting relative rotation of the back frame with respect to the base member, and a locking state of restricting the relative rotation;
   a cushion frame that is a frame member of a seat cushion, and is connected to the back frame so as to be able to rotate around a second rotation shaft that is parallel to the first rotation shaft, and in which is formed a long hole whose length direction runs along a vehicle longitudinal direction;
   a link member connected to the base member so as to be able to rotate around a third rotation shaft that is parallel to the first rotation shaft;
   a fourth rotation shaft that is fixed to the link member, and is inserted in the long hole so as to be able to move relatively in the length direction and so as to be able to rotate around its own axis that is parallel to the first rotation shaft, and, when the seatback and the seat cushion are in states of usage, the fourth rotation shaft is positioned at one end portion in the length direction of the long hole, and, when the seatback and the seat cushion are in stored states, the fourth rotation shaft is positioned further toward another end portion side in the length direction than the one end portion of the long hole; and
   a movement restricting portion that is provided at an inner surface of the long hole and at the fourth rotation shaft, and that, when the rotation locking mechanism is in the locking state and the seatback is in the state of usage, restricts movement of the fourth rotation shaft from the one end portion toward the other end portion side.

2. The vehicle seat of claim 1, wherein, when the seatback and the seat cushion are positioned in predetermined rotation regions, the seatback and the seat cushion are in the states of usage.

3. The vehicle seat of claim 1, wherein the movement restricting portion includes:
a retainer projection that is provided at a region, which is positioned further toward the other end portion side than the one end portion, of the inner surface of the long hole; and
a catching/releasing surface that is an outer peripheral surface of the fourth rotation shaft that, when the seatback is in the state of usage, faces the retainer projection in the length direction and restricts movement of the fourth rotation shaft further toward the other end portion side than the retainer projection, and, when the seatback transitions from the state of usage to the stored state in a state in which the fourth rotation shaft is positioned at the one end portion, does not face the retainer projection in the length direction and permits movement of the fourth rotation shaft further toward the other end portion side than the retainer projection.

4. The vehicle seat of claim 3, wherein the catching/releasing surface includes:
a restricting surface whose cross-sectional shape cut in a plane orthogonal to the fourth rotation shaft is an arc, and that, when the seatback is in the state of usage, faces the retainer projection in the length direction and restricts movement of the fourth rotation shaft further toward the other end portion side than the retainer projection; and
a permitting surface whose both end portions in a peripheral direction whose center is the fourth rotation shaft is connected to the restricting surface, and that, when the seatback transitions from the state of usage to the stored state in the state in which the fourth rotation shaft is positioned at the one end portion, permits movement of the fourth rotation shaft further toward the other end portion side than the retainer projection, while facing the retainer projection in a width direction of the long hole.

5. The vehicle seat of claim 4, wherein:
an end surface at the one end portion side of the inner surface of the long hole is a first end surface that is arc-shaped, and
when the fourth rotation shaft is positioned at the one end portion, the restricting surface faces the first end surface.

6. The vehicle seat of claim 4, wherein:
an end surface at the other end portion side of the inner surface of the long hole is a second end surface that is arc-shaped, and
when the fourth rotation shaft is positioned at the other end portion, the restricting surface faces the second end surface.

7. The vehicle seat of claim 1, wherein:
the seat cushion that is in the state of usage enters into the stored state by moving toward a front and lower side, and
a shape of the long hole when the cushion frame is viewed in the vehicle transverse direction is an arc shape that is convex toward a lower side.

* * * * *